April 5, 1966   J. J. J. STAUNTON ETAL   3,244,287
CONTINUOUS FILTRATION

Filed Dec. 21, 1962   3 Sheets-Sheet 1

INVENTORS
John J. J. Staunton
Kenneth R. Bell
BY
Bair, Freeman & Molinare
Attys.

April 5, 1966  J. J. J. STAUNTON ETAL  3,244,287
CONTINUOUS FILTRATION
Filed Dec. 21, 1962  3 Sheets-Sheet 2
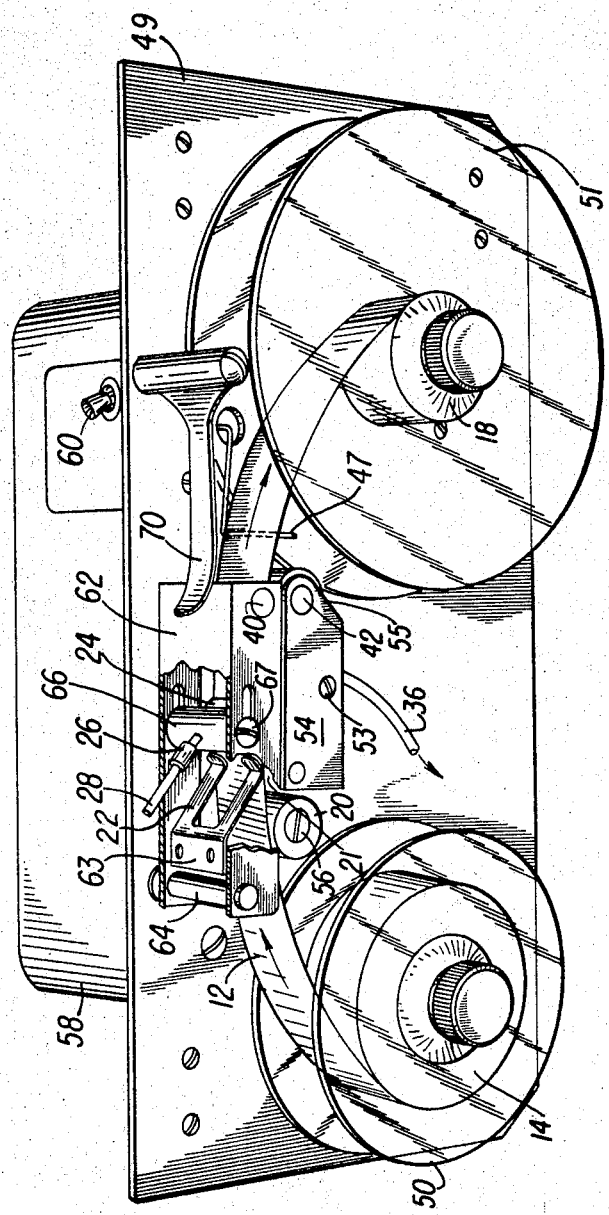
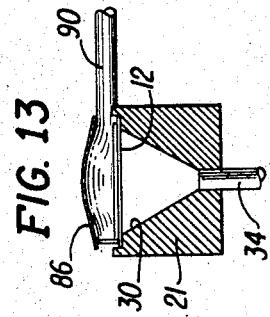
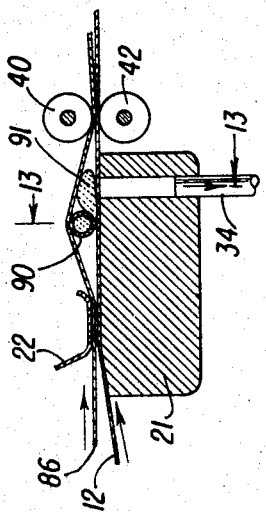
INVENTORS
John J. J. Staunton
Kenneth R. Bell
BY Bair, Freeman & Molinare
Attys.

April 5, 1966 J. J. J. STAUNTON ETAL 3,244,287
CONTINUOUS FILTRATION
Filed Dec. 21, 1962 3 Sheets-Sheet 3
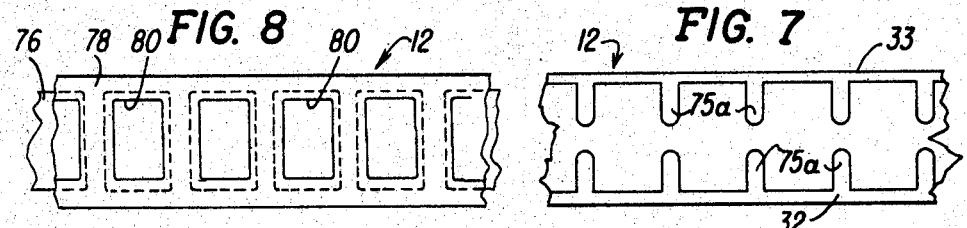
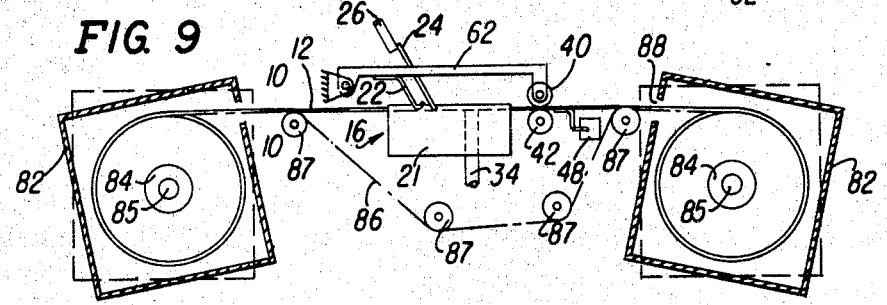
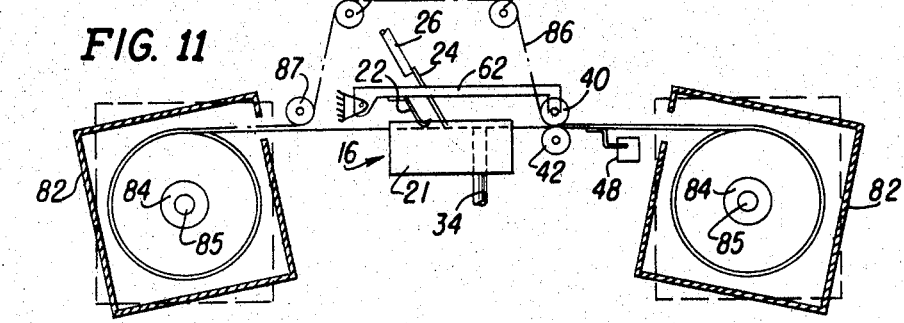
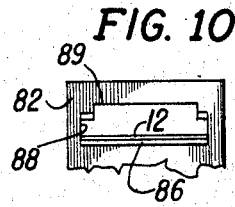
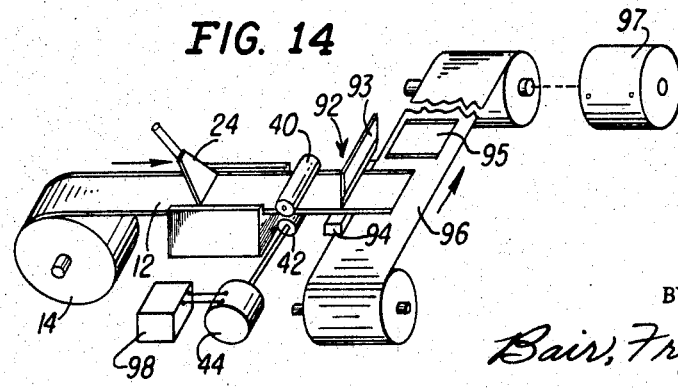
INVENTORS
John J. J. Staunton
Kenneth R. Bell
BY
Bair, Freeman & Molinare
Attys.

3,244,287
CONTINUOUS FILTRATION
John J. J. Staunton, Oak Park, and Kenneth R. Bell, Niles, Ill., assignors, by mesne assignments, to Coleman Instrument Corporation, Maywood, Ill., a corporation of Delaware
Filed Dec. 21, 1962, Ser. No. 246,430
8 Claims. (Cl. 210—387)

This invention relates to continuous filtration and, more particularly, to improved continuous filtration means for use as part of an automatic continuous analytical system. Such filtration means comprise article, and apparatus for filtering a sample solution to be analyzed.

The basic concept and operation of a continuous analytical system, as for example, a system utilized to analyze blood, is known, and reference may be made to copending application, Serial No. 177,105, filed on March 2, 1962, by Kenneth R. Bell et al. for a description of such continuous analytical system. In such system, certain analyses require the removal of an interfering constituent, such as protein, before the developing of the color which acts as a measure of the constituent being measured. While this protein may be removed by dialysis, a process which has been known for many years, elimination of the protein by this means is inefficient, relatively slow, and necessitates a careful control of temperature and other factors to be truly quantitative. A more straightforward solution is to add a reagent to the sample stream which precipitates the protein and then to remove the precipitate from the sample stream by suitable separating means. The two most common means of separation are filtration and centrifugation. These methods are used for discontinuous or batch procedures in the laboratory, however, for a continuous process, centrifugation offers many difficulties, so that filtration is the preferred approach.

One type of prior art continuous filter arrangement that might be used in a continuous analytical system comprised a paper filter strip which passed at a slow rate of speed from a supply roller over a filter area onto a take-up roller. Sample solution containing a precipitate in suspension was carried by a conduit to the underside of the filter strip. The solution flooded the underside of the paper strip and the greater part of the solution dropped off from the underside of the filter strip into a drain. Suction was utilized to draw a small filtered sample through a small aperture in a polished, stainless steel cylinder disposed above the filter strip. The filter strip was moved at a very slow rate, on the order of 0.5 inch per hour, and the rate of flow of the filtered sample was relatively low, on the order of 0.2 milliliter per minute. The unfiltered sample was presented to the filter strip at a rate of about 42 milliliters per minute. The prior art arrangement was satisfactory when the quantity of precipitate in the solution was small and presented no disposal problem and a slow rate of analysis could be tolerated, but it was found to be unsatisfactory for the stringent requirements of continuous filters used in continuous analytical systems.

Among the requirements and desiderata for a high-speed, continuous filtration system are that the continuous filter must be capable of handling a sample of about 3 to 5 milliliters per minute without wasting or discarding any of the sample, since the available quantity of sample is limited. Further, the filter must be capable of filtering samples which may contain up to 20 percent solids. Intermixing between successive portions of samples must be negligible as each sample may be of a markedly different concentration.

An important object of the present invention is to provide improved continuous filtration means for a continuous analytical system wherein the disadvantages and deficiencies of prior constructions are obviated.

Another object of the present invention is to provide improved continuous filtration means wherein solution to be analyzed is confined to predetermined portions of the filter.

A further object of this invention is to provide an improved filter for a continuous analytical system, which filter is treated with a hydrophobic material so as to render certain portions of the filter non-wettable, whereby the solution to be analyzed will be confined to predetermined portions of the filter.

Yet another object of the present invention is to provide continuous filter apparatus wherein the solution to be analyzed is discharged onto the top of the filter and is confined to discrete portions of the filter without spillover therefrom.

It is also an object of the present invention to provide continuous filter apparatus with means for severing the filter tape after filtration of a sample in order to provide for analysis of the precipitate at a remote location.

These and other objects of the present invention will be made more apparent as the following description proceeds and the features of novelty which characterize this invention will be pointed out with particularity in the claims annexed to and forming part of this specification. The present invention is shown in the accompanying drawings, wherein like numerals refer to like elements, and in which:

FIGURE 2 is a perspective view of the continuous filter apparatus of this invention, with parts broken away for clarity;

FIGURES 6, 7 and 8 illustrate various embodiments of filter strips or tapes embodying the present inventive concept;

FIGURE 9 is a schematic view, partly in section, of a modified form of continuous filter apparatus wherein an interleaved strip is used with the filter strip and showing one manner of bypassing the interleaved strip about the filter station;

FIGURE 10 is a fragmentary view illustrating the opening in the filter strip magazine taken generally along line 10—10 of FIGURE 9;

FIGURE 11 is a schematic view, partly in section, of a further modification of the continuous filter apparatus shown in FIGURE 9, showing another manner of bypassing the interleaved strip about the filter station;

FIGURE 12 is a detailed cross-sectional view of a continuous filter arrangement by means of which air leakage or loss of filtrate is minimized;

FIGURE 13 is a cross-sectional view of the continuous filter arrangement of FIGURE 12 taken generally along the line 13—13 of FIGURE 12; and FIGURE 14 is a schematic view of a further modification of a continuous filter apparatus illustrating means for severing discrete portions of the filter strip and a conveyor for receiving the discrete portions of the filter strip and conveying them to a remote location for analysis of the precipitate thereon.

Figure 1:
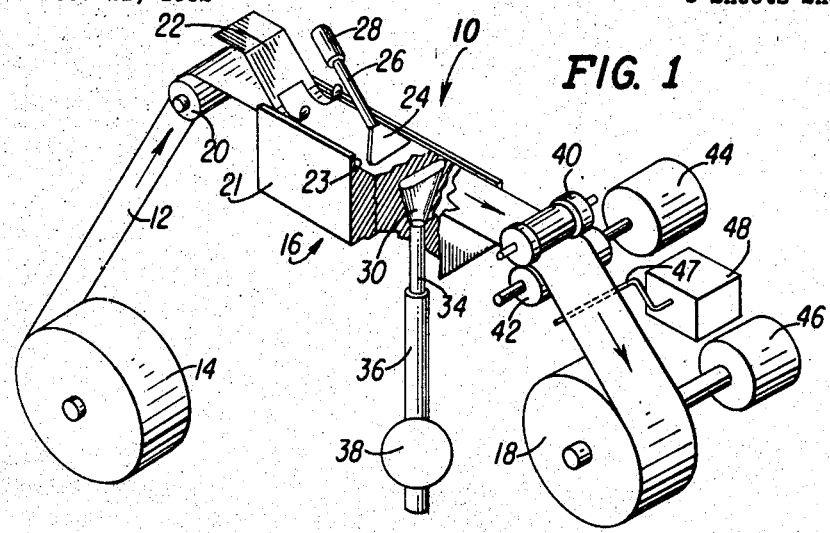
FIGURE 1 is a perspective, schematic illustration, partly in section, of a continuous filter apparatus embodying the present invention.

Referring now to FIGURE 1, there is illustrated a perspective schematic illustration of the continuous filter apparatus of the present invention. The continuous filter apparatus 10 comprises a filter strip or tape 12 which passes from a supply roll 14 over the filter area or station 16 onto a take-up roll 18. The filter tape 12 passes over a cylindrical support 20 and is held in engagement with the top of the block 21 by means of a tape guide 22. The tape passes through a suitable groove 23 in the block 21. In this manner, lateral movement of the filter tape is restricted and the filter tape is maintained in position on the block 21 as it passes over the block.

The means for discharging the sample solution, which may contain flocculent precipitates, onto the top of the filter tape 12 comprises a discharge tube 26 to the end of which is affixed a spreader 24. The solution is fed to the tube 26 through conduit 28 from a suitable source and is discharged through the tube 26 onto the underside of the spreader 24. The spreader uniformly distributes the slurry or solution containing the flocculent precipitates over the top of the filter tape 12.

The underside of the filter tape 12 is exposed to a vacuum chamber defined by an elongated opening or passage 30 through the block 21, which passage communicates with a suction source. The filtrate is drawn through the filter tape 12 and the precipitate remains thereon. Filtrate drawn through the elongated opening 30 enters the tube 34 and passes therefrom through conduit 36 to a mechanism, such as a spectrophotometer, for analyzing the filtrate. A suitable pump mechanism 38 may be provided in line 36 for providing a vacuum in the vacuum chamber, thus drawing the filtrate through the filter tape 12.

An important feature of the present invention is the provision of a positive, constant speed drive for the filter tape 12. Such drive comprises a knurled roller 42 which may be driven by a geared synchronous clock or timer motor 44. Pressure is applied to the filter tape from above to maintain it in engagement with the drive roller 42, such means for applying the pressure comprising a hold-down roller 40 which is biased toward the drive roller 42 either by gravity or by a spring. It will be apparent that the tape can be perforated adjacent the edges and that a sprocket drive may be used in place of the roller 42. In one embodiment of the present invention, the drive means or motor 44 drives the tape at a rate of approximately 5 inches per minute. This speed has been found satisfactory as it is fast enough that flocculent precipitates build up on the tape to a desired thickness while at the same time the rate of paper consumption is not objectionable. It will be apparent to those having skill in the art that should samples of larger or bulkier precipitate content be common, a greater tape speed could be used and, likewise, if the samples were of lighter and less bulky precipitate, then a slower tape speed could be utilized.

A suitable drive motor 46 is provided for the take-up roll 18. The drive motor 46, which may be a stall-type motor, rotates the take-up roll 18 at a rate of speed adequate to wind the tape 12 onto the roll 18. The motor 46 can be stalled indefinitely without harm so as to avoid exerting a force on the tape which might interfere with the operation of the constant speed drive.

If the tape should break or run out, the motor 46 must be stopped before the roll 18 is accelerated to a high speed. Accordingly, a safety switch or cut-off switch 48 may be provided to turn off the drive motors 44 and 46. Normally, the arm 47 of switch 48 is held down by the tape, maintaining the switch closed. When the tape breaks or runs out, arm 49 will raise, actuating the switch to open the circuit to motors 44 and 46.

The present drive arrangement is superior to direct drives from one roll to another in that excessive variations in the thickness of the filter sample or precipitate deposit on the top of the filter tape 12 is minimized.

Our drive arrangement would not be practical unless it were possible to keep the drive roller 42 free from pickup of the precipitate on the filter tape 12. Accordingly, another feature of the present invention is the improvement in the filter tape whereby the sample discharged onto the top thereof is confined to predetermined portions of the filter tape.

The wetting of the filter tape is confined to predetermined areas by treating or impregnating predetermined portions of the filter tape with a hydrophobic or impervious material. In a preferred embodiment of the invention, the filter tape is made from a strip of paper, as for example, Whatman's No. 1 filter paper. With a tape one inch wide, a strip substantially $\frac{1}{16}$ inch wide along each edge thereof is treated with a silicone. Thus, the solution discharged onto the filter tape is confined to the central portion of the filter tape.

Though there are a number of ways to apply a silicone to the edges of the filter tape, one of the preferred manners of so doing would be to run the filter paper from one spool to another past an offset printing roller which, in a manner well known in the printing arts, prints a strip of the silicone along each edge. A preferred type of silicone is methyl silane in a toluene base, manufactured and sold by the General Electric Company as SR53. After application to the filter paper, this liquid dries rapidly and then combines with carbon dioxide from the air to form a hydrophobic silicone. Another method of applying silicone to the edge of the filter tape would be to dip a roll of tape into a solution of methyl silane such that only the edges thereof would be impregnated. A third method of applying a silicone to the edge of the filter tape would be to provide a pair of wicks adjacent the supply roll, one at each side thereof. The wicks would bear upon an edge of the filter tape and supply a silicone thereto to promote non-wetting of the edges.

Referring now to FIGURE 2, it is seen that the continuous filter apparatus 10 is affixed on a mounting plate 49, which is adapted to be mounted in a continuous analytical apparatus. It is seen that the supply roll 14 and take-up roll 18 of filter tape 12 are mounted on reels 50 and 51, respectively, rotatably supported on the mounting plate 49.

The block 21 is affixed to the mounting plate 49 by suitable fastening means which may comprise bolts or cap screws 53 extending through the mounting brackets 54 disposed on each side of the block 21 and engaging with the mounting plate 49.

The drive roller 42 is rotatably mounted in apertured ears 55 at one end of the mounting brackets 54. The cylindrical support 20 may be fixedly mounted to the mounting plate 49 adjacent the other end of mounting bracket 54 by suitable fastening means, as for example, bolt 56.

Contained within the housing 58 on the rear of the mounting plate 49 are the drive motor 46 for rotating the reel 51 to take up the tape 12, the geared motor 44 for driving the drive roller 42 and the cut-off switch 48. Switch means 60 shown on the top of the housing 58 are provided for selectively energizing and de-energizing the motors 44 and 46.

The means for supporting the paper guide 22, the spreader 24 and the hold-down roller 40 comprises a frame 62 pivotally secured to the stud 64 affixed to the mounting plate 49. The flange 63 at the lefthand end of the paper guide 22 is affixed directly to the top of the frame 62 by suitable connecting means. The hold-down roller 40 is rotatably supported in openings in the depending flanges or sides 65 of the frame 62. The tube 26 which supports the spreader 24 in position adjacent the top of the filter tape 12 extends through and is affixed to the tubular member 66 adjustably connected between the flanges 65 of the frame 62. By loosening the screws 67 which connect the tubular member 66 to the frame 62 and sliding the screws in the slot 68 provided in the flanges 65, the position of the spreader 24 with respect to the opening 30 in the block 21 may be adjusted.

The frame 62 pivots about the stud 64 and the free end thereof is urged downwardly toward the block 21 by means of the hold-down spring 70. Obviously, the hold-down spring 70 may be dispensed with if suitable weight is provided adjacent the free end of the frame 62 to bias the hold-down roller 40 into engagement with the drive roller 42.

Figure 3:
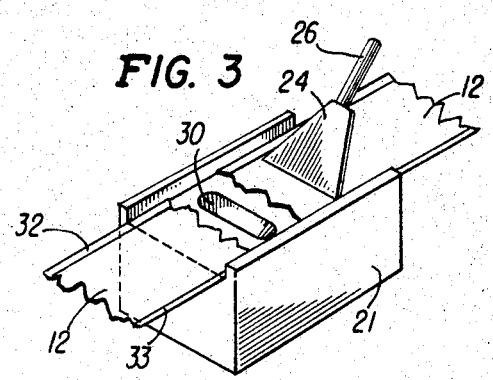
FIGURE 3 is a detailed perspective view of a portion of the continuous filter apparatus of FIGURE 1, illustrating more clearly a preferred form of the spreader for discharging solution onto the filter and of the filter strip.

Considering now FIGURE 3, there is illustrated an enlarged view of the support member or block 21, the spreader 24 and the filter tape 12 passing over the block 21. For purposes of clarity and explanation, the treated edges of the tape 12 have been indicated at 32 and 33, as though the hydrophobic material included a dye. In one embodiment of the filter tape, white filter paper is used and the hydrophobic material is colorless. After a sample to be filtered is discharged onto the tape, the center portion of the tape darkens and the edges remain white, indicating that no filtrate penetrated into the treated edges. An important advantage of treating the edges of the tape with silicone is that the tape retains its dry tensile strength. Normally, failure of the wet tape, which is usually made from paper, is by tearing which starts at an edge of the tape. By impregnating the edges of the tape with a hydrophobic material, the edge strength of the tape is maintained and a failure of this nature is obviated.

It is preferred that the filter block 21 be made from a material that is also hydrophobic. A preferred material is a polytetrahalogen, as for example, polytetrafluoroethylene, which is not only hydrophobic but also has a very low coefficient of friction. By virtue of the low coefficient of friction, drag on the wet tape is minimized, thus making the use of low wet strength tape feasible so that compromise between wet strength and filtering efficiency is avoided. The hydrophobicity of the polytetrahalogen not only aids the slip of the wet tape, but more importantly, cooperates with the specially treated tape to retain the filtrate within a limited filter area. This important aspect of the invention will be considered more fully later. It will be understood that other materials, such as polyethylene, siliconed plastic, or metal could be used for filter block 21 with some sacrifice in the advantages of the polytetrahalogen or polytetrafluoroethylene block.

The means for discharging and spreading sample solution on the tape comprises an open fan-shaped spreader 24 affixed to a tube 26. The tube, which in a preferred form of the invention has a ⅛ inch I.D., may be made from stainless steel or plastic and the spreader may be made from a suitable wettable material, such as stainless steel or plastic. The spreader may be ¾ inch across the bottom and about ½ inch high. This spreader is effective and uncontaminated by the usual sample containing up to 20 percent solids or precipitates.

In use, the spreader blade 24 is supported a little above the tape to permit an even layer of sample to pass beneath its bottom edge. Further, the spreader blade 24 is located about one-half inch before the elongated opening 30 to give the filter paper time to wet through. By this arrangement, the loss of filtrate is minimized.

The size of the elongated opening or slot 30 in a filter block 21 accommodating a one-inch wide filter tape is approximately ¾ inch by 3/16 inch. The ⅞ inch wide central strip of tape that is wetted seals all around the opening to minimize drawing air through the tape. Thus, it is seen that the spreader is of sufficient width to spread solution onto the top of the filter tape over a width at least as great as the width of the elongated opening 30 defining the vacuum chamber in block 21. Filtrate cannot escape or spill over the top of the tape 12 because of the treated edges of the filter tape. Filtrate cannot escape between the bottom of the tape 12 and the flat top of the block 21, as the tape edges 32 and 33 and the top surface of the block are hydrophobic. Consequently, no stray solution is left on the top surface of the block to contaminate a succeeding sample.

Figure 4:
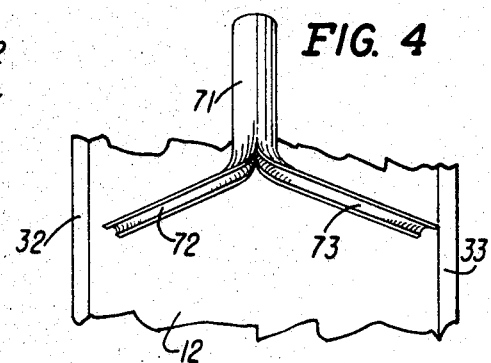
FIGURE 4 is a perspective view of a modified form of spreader.
Figure 5:
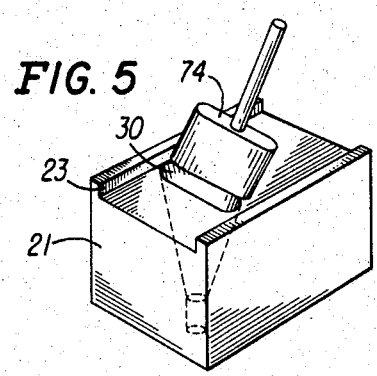
FIGURE 5 shows a detailed perspective view of a portion of the continuous filter apparatus of FIGURE 1 and illustrates a further modification of the spreader.

Referring to FIGURES 4 and 5, there are illustrated different embodiments of the spreading means of this invention. The spreader 71 illustrated in FIGURE 4 comprises a tube made from plastic or the like which is split up the middle and spread to form wings or arms 72 and 73 on the end thereof. The wings or arms are not aligned with one another, but rather make a slight angle with a transverse plane passing through the tube so as to permit solution to be discharged from the undersides of the wings 72 and 73. This form of spreader may be utilized to give a greater deposit near the middle of the tape, or the arms 72 and 73 may be flattened back to give a more uniform and even spread across the width of the tape. The spreader 71 is disposed closely adjacent the top surface of the tape 12 so that a pool or puddle of the sample is discharged on the top of the tape beneath the spreader 71 and between the treated hydrophobic edges 32 and 33 of tape 12.

In use, it has been found desirable in the interests of speed to apply a higher suction and allow some air to penetrate the filter. Should this be undesirable, particularly when low percentages of precipitates are present in the samples, the distance between the spreader and the suction opening 30 may be reduced, or the enclosed spreader 74 of FIGURE 5 may be employed. The spreader member 74 is entirely enclosed on the sides and has an open bottom which conforms in size to that of the elongated opening 30. The bottom of the spreader 74, covers the elongated opening 30 in block 21 and is spaced from the top of the tape, but being sealed by the surface tension of the sample discharging through the spreader. When properly adjusted, the bottom trailing edge of spreader 74 clears the surface of the forming precipitate cake so as to avoid build-up and no air will be sucked through the filter while reasonable filtrate recovery efficiency is maintained. In each instance, the spreading means are narrower at the bottom than the width of the filter tape. The width of each spreading means is approximately the same as the width of the elongated opening in block 21.

Figure 6:
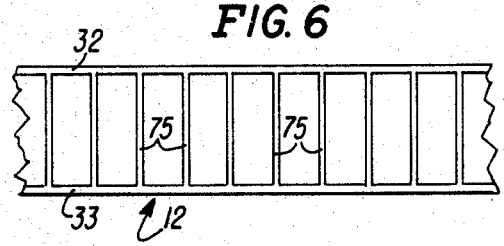

Should it be desired for operational reasons to have the sample stream segmented, that is, consist of alternate slugs of solution and air, the filter tape embodiments illustrated in FIGURE 6, 7 or 8 can be used. These arrangements control not only the lateral but also the longitudinal migration of the filtrate in the paper. As aforenoted, the areas that are impregnated with the hydrophobic material are normally colorless. However, for purposes of clarity, the impregnated areas will be considered as though they had been treated with a dye. In FIGURES 6 and 7, transverse portions of the tape are impregnated with a hydrophobic material, as indicated by the crossbars 75. In FIGURE 6, the hydrophobic material, which may be silicone, extends transversely of the tape from one edge to the other, whereas in FIGURE 7, the transverse strips or crossbars 75a are discontinuous. In each case, the crossbars will prevent intermixing between successive samples, if these samples are fed to the filter tape in close succession, by restricting the longitudinal migration of the filtrate in the filter tape.

The filter tape shown in FIGURE 8 comprises a first untreated strip 76 laminated to a treated strip 78 having openings or perforations 80 therein. The treated strip may be impregnated in entirety with a silicone or other hydrophobic material.

Prior art filters not having the migration control of the filtrate afforded by the present invention have been restricted to very low filtration rates where little precipitate was formed on the filter tape. A sample having substanal precipitate contained therein was deposited in a narrow streak down the center of the tape and the retardation rate of the surface roughness of the tape was depended upon to restrict the precipitate deposit to the confines of the tape. As can be readily understood, the sample was deposited unevenly over the width of the filter tape, resulting in slow filtering and clogging at the center of the tape, with a much higher speed of filtrate extraction through the edge regions of the tape. Even if the tape were moved slowly, the center thereof would remain wet while the edges were dry, and thus there would be air leakage through the tape, causing a loss of suction, which aggravates the non-uniformity of the filtrate passing through the filter tape.

By controlling the precipitate location on the tape 12 and relieving the central portion of the hold-down roller 40 (as seen in FIGURE 1), the roller 40 does not contact the precipitate as it passes beneath the roller 40. Thus, there is no buildup of precipitate on the roller 40, and therefore, no interference with the constant speed drive.

From the foregoing, it is clear that by restraining the penetration of filtrate into the edges of the tape, it is possible to lay down a uniform layer of sample solution over a much larger area of the tape and to apply suction evenly to the entire width of the filter bed on the tape, thus enabling a considerable increase in filtering speed with a reduced likelihood of premature punch-through of the air at any point in the filter tape.

A significant advantage associated with the greater capacity of the filter apparatus of this invention is that whole blood samples can be handled for analysis even though such samples contain large amounts of precipitate due to cell residue. Continuous filters not utilizing the present invention must be restricted to serum, thus making a time-wasting pre-centrifuge operation necessary on the samples.

A further embodiment of our invention consists in also printing on the filter tape a layer of a diatomaceous material, such as diatomite or Johns-Manville "Celite" filter aid. This material is a finely divided powder which augments the filter action and prevents channeling by streaming to plug the larger pores in the filter. Further, this material supports and provides agitation for gummy and stringy precipitates to minimize excessive plugging of the filter mesh.

Though the filter aid may be added to the sample solution prior to discharge from the spreader 24, this is undesirable as it would increase the solids content of the sample and would tend to cause undue buildup on the spreader. It is preferred that the filter aid be printed onto the tape from a water suspension after the application of the silicone, running the tape past a dryer between the printing operations.

However, where a high filter aid concentration is required, it has been found that there may be print-off from one layer of tape on the spool to the bottom of the next layer. Such print-off may be eliminated by interleaving a strip of paper or plastic which will be discarded during use of the filter strip. It is important that no filter aid migrate onto the underside of the filter tape where it could be washed with the filtrate into the conduit 36 because such material in the filtrate would obscure the light beam in the spectrophotometer used as a measuring device in the continuous analytical system, thus producing a spurious and faulty result in the measurement.

Another advantage of providing non-filtering edges or siliconed edges on the filter tape is that none of the filter aid is exposed at the edge of the tape in the filter strip, and thus the chance of its becoming dislodged and migrating to the wrong side of the filter tape is reduced sharply.

To further minimize contamination of the filter tape, it is desirable that the filter tape be carried in a magazine, such as a vacuum-formed transparent plastic box, which would not only protect the tape from contamination but would also keep filter aid from becoming dislodged from the interstices of the filter tape in the dry state. Both the magazine and the interleaving tape may be made from a plastic, such as polyethylene or methyl methacrylate, which normally has a pronounced electrostatic charge that captures and holds any stray filter aid particles. The few particles which may be transferred to the edges of the unreeling tape by friction are of little consequence because the filter tape excludes the edges from the filtering process.

Referring now to FIGURE 9, there is illustrated a modification of the continuous filter apparatus utilizing magazines for enclosing the take-up roll and the supply roll. The magazines 82, which surround and enclose the supply roll and the take-up roll, each consist of a relatively shallow square box having front and back sections which telescope onto one another. The hubs 84 upon which the supply roll and the take-up roll are mounted are rotatably supported in the magazines 82.

The magazines 82, which may be identical in structure, are pivotally supported on an axle or stub shaft 85 so that in use the magazines can swing from the solid line position to the dotted line position to facilitate the passage of the tape through a slot or opening 88 in the magazines. After passage through the opening or slot 88, the interleaving layer 86 is separated from the filter tape 12. The interleaving layer 86 passes over guide means which may comprise guide rollers 87 and thus bypasses the filter area wherein the sample solution is filtered through the filter tape 12. Both tapes are then taken up on the take-up roll in magazine 82. To facilitate attachment to the take-up reel, the interleaving layer or tape 86 is made longer to allow for a circuitous path and both tapes 12 and 86 may be provided with pressure-sensitive tabs on the leading end thereof to facilitate attachment to the hub 84 on the take-up roll.

Turning now to FIGURE 10 there is shown more clearly the opening or slot 88 in the magazine 82. The central portion 89 of the slot 88 is relieved to prevent precipitate buildup on the edges of the slot. It will be apparent that the magazine 82 may be fixed, if desired, so that the tape only contacts the bottom edge of the opening 88 adjacent to the underside of the tape, thus providing another manner of avoiding precipitate buildup at the opening from the magazine.

In FIGURE 11, there is shown an alternative arrangement for bypassing the interleaving strip 86 about the filter area. Further description is believed unnecessary as the construction is in all respects similar to that of the continuous filter shown in FIGURE 9, other than the different positioning of the filter tape guide means or guide rollers 87. It is preferred that the interleaving tape 86 be porous to absorb any residual filtrate and also that the tape 86 be longer than the filter tape 12 by approximately one turn around the full supply roll plus the extra length of the tape engaging the bypass rollers or supports 87.

In FIGURES 12 and 13, there is illustrated another arrangement at the filter station, wherein air leak through the filter may be minimized. Both the interleaving tape 86 and the filter tape 12 pass under the paper hold-down guide 22. The filter tape 12 continues to pass over the filter block 21 beneath the spreader 90. The top of the spreader 90 comprises a guide over which the interleaving tape 86 passes. Both tapes then engage one another between the hold-down roller 40 and the drive roller 42 so as to enclose the sample 91 in a pocket therebetween, thereby substantially reducing the chance of air leak or loss of filtrate. As can be seen in FIGURE 13, the top of the spreader 90 may be formed so as to have a raised center and lower edge portions so that the pocket may be more clearly defined about the sample 91. The interleaving tape may be made from a non-wetting elastomer, such as a polyethylene tape one to two mils thick.

Another embodiment of a continuous filter apparatus incorporating the present invention is illustrated in FIGURE 14. The form of the continuous filter apparatus herein illustrated is particularly adapted for use with the filter tape of FIGURES 6 through 8 having predetermined compartmented areas formed thereon. Means are provided for intermittently driving the roller 42. Such means may be either manual or electro-mechanical, as for example, the motor 44 may be controlled by a suitable control 98 so as to advance the tape one section at a time. This is particularly desirable in continuous analytical procedures where discrete samples are to be filtered and the precipitate is to be retained for subsequent evaluation by ashing or other methods.

Disposed adjacent the drive roller 42 are cutting means for severing discrete sections of the filter tape. Such cutting means 92 comprise a blade 93 which engages a support or cooperating edge 94 for severing the sections of the filter tape. The cut sections 95 of tape 12 are discharged onto a conveyor mechanism 96 which may be disposed either transversely or longitudinally of the filter tape for carrying the severed sections 95 of tape to a remote location for analysis. Suitable drive means 97 are provided for actuating the conveyor mechanism 96. It is apparent that the modification of the invention illustrated in FIGURE 14 embodies all of the advantages of the continuous filter and at the same time also provides for analysis of the precipitate in a serial order. The increase in speed and convenience and the reduction in cost per simple filtration afforded by the embodiment is believed apparent.

We have provided by the present invention a practical continuous filter for use in a continuous analytical system. The novel construction of this invention permits continual filtering action on bulky, flocculent, and hard-to-handle precipitates without danger of clogging and with highly efficient filtrate recovery. Filtrate is confined to predetermined portions of the filter tape by virtue of the non-wetting treatment applied to edge portions or predetermined portions of the filter tape. The application to the tape of a hydrophobic material not only provides for the non-wettability of certain sections, but also enhances the wet strength of the filter tape. The application of a diatomaceous material to the filter tape in one embodiment of the invention augments the filter action, prevents channeling by streaming to plug the larger pores, and supports and provides agitation for gummy and stringy precipitates to minimize excessive plugging of the filter. Thus, from the foregoing, it can be seen that there has been provided not only a novel filter tape for use in a continuous filter apparatus, but also an improved continuous filter apparatus and an improved method of continuous filtration.

While we have shown and described specific embodiments of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

We claim:

1. Continuous filter apparatus for use in a continuous analytical system comprising a filter station having a support member having the upper surface thereof made from a hydrophobic material, filter means movable over said upper surface of said support member, said filter means having the edges thereof treated with a hydrophobic material to confine liquid to be filtered to the untreated portions of the filter means, means for discharging a solids-liquid mixture sample onto the top of said filter means, said support member having an opening therein over which the filter means moves, and means communicating with said opening for collecting liquid beneath said movable filter means, the solids remaining on said filter means, and means for moving said filter means over said support member, said moving means comprising a pair of cooperating rollers positioned on opposite sides of said filter means and engaging said filter means for moving said filter means by said filter station, the central portion of the roller engaging the upper surface of the filter means being relieved so as to prevent contact of said roller with solids carried on the filter means.

2. Continuous filter apparatus as in claim 1 wherein said moving means are intermittently actuated and wherein said apparatus includes cutting means for severing a portion of the filter means containing solids, and means for conveying the severed portion of the filter means to a remote location for analysis.

3. Continuous filter apparatus for use in a continuous analytical system comprising a filter station having a support member, filter means movable over said support member, said filter means comprising a tape having the edge portions thereof impregnated with a hydrophobic material to confine liquid to be filtered to the central unimpregnated portions of the tape, means for discharging a solids-liquid mixture sample onto the top of the tape, means for spreading the sample uniformly on the tape, said support member being made from a polytetrahalogen material and having an opening therein over which the tape moves, suction means communicating with said opening for drawing liquid through the filter tape into the opening, said sample being confined between the edge portions of said tape for facilitating use of higher suction and thereby increasing efficiency and speed of filtration, the solids remaining on the filter means, and drive means for moving said filter tape over said support member.

4. Continuous filter apparatus for use in a continuous analytical system comprising a filter block having a hydrophobic upper surface and a vacuum chamber therein, a filter tape movable over said hydrophobic upper surface and over said vacuum chamber in said block from a supply roll to a take-up roll, said filter tape having the edges thereof impregnated with a hydrophobic material confining liquid-solid sample to predetermined central portions of the tape, means for discharging a sample to be analyzed onto the top surface of the filter tape, vacuum means for creating a vacuum in said vacuum chamber to draw liquid through said filter tape, and constant speed drive means for moving said filter tape across said block, said constant speed drive means comprising a pair of cooperating rollers, the roller engaging the top surface of said filter tape having a relieved portion to avoid contact with any solids on the filter tape, at least one of the rollers being driven by a geared motor.

5. A continuous filter apparatus as in claim 4 wherein one roller has a knurled surface engaging adjacent the edges of said filter tape and the other roller comprises a hold-down roller which cooperates with said one roller for operatively engaging and moving said filter tape.

6. Continuous filter apparatus for use in a continuous analytical system comprising a filter station having a support member, filter means movable over said support member, said filter means comprising a tape having the edge portions thereof impregnated with a hydrophobic material to confine filtrate to the central unimpregnated portions of the tape, means for discharging a solids-liquid mixture sample onto the top of the tape, means for spreading the sample uniformly on the tape, said support member having an upper surface made from a hydrophobic material and having an opening therein over which the tape moves, suction means communicating with said opening for drawing liquid through the filter tape into the opening, said sample being confined between the edge portions of said tape for facilitating use of higher suction and thereby increasing efficiency and speed of filtration, the solids remaining on the filter means, and drive means for moving said filter tape over said support member.

7. A filter tape for use in a continuous analytical system comprising porous filter means having portions thereof impregnated with a hydrophobic material so as to confine solid-liquid sample to the unimpregnated portions of the filter means, said filter means comprising a first elongated paper strip impregnated with a hydrophobic agent and having spaced openings therein of predetermined configuration adapted to receive solid-liquid sample and a second elongated untreated strip laminated to said paper strip for filtering the solid-liquid sample and retaining the solids thereon.

8. A filter tape for use in a continuous analytical system comprising porous filter means having portions thereof impregnated with a hydrophobic material so as to confine solid-liquid sample to the unimpregnated portions of the filter means, said filter means comprising a roll of paper, and a diatomaceous material being applied to the surface of the paper adapted to receive the sample to augment the filter action and minimize excessive plugging of the paper, said diatomaceous material being confined to the untreated portions on said surface of the paper to minimize print off from one layer to the next on the wound roll.

References Cited by the Examiner

UNITED STATES PATENTS

| | | | |
|---|---|---|---|
| 2,129,754 | 9/1938 | Yagoda | 23—253 |
| 2,349,469 | 5/1944 | Sloan | 210—447 X |
| 2,734,377 | 2/1956 | Traver | 210—387 X |
| 2,854,352 | 9/1958 | Gronemeyer | 117—44 |
| 3,084,987 | 4/1963 | Bounin | 210—401 X |
| 3,098,719 | 7/1963 | Skeggs | 23—253 |
| 3,127,281 | 3/1964 | Meyer | 23—253 |

REUBEN FRIEDMAN, *Primary Examiner.*

HARRY B. THORNTON, *Examiner.*